United States Patent
Sakai et al.

(10) Patent No.: US 10,008,963 B2
(45) Date of Patent: Jun. 26, 2018

(54) POSITION CONTROL DEVICE

(71) Applicant: OKUMA Corporation, Niwa-gun, Aichi (JP)

(72) Inventors: Takeshi Sakai, Aichi (JP); Masashi Miyaji, Aichi (JP)

(73) Assignee: OKUMA CORPORATION (JP)

(*) Notice: Subject to any disclaimer, the term of this patent is extended or adjusted under 35 U.S.C. 154(b) by 247 days.

(21) Appl. No.: 14/686,529

(22) Filed: Apr. 14, 2015

(65) Prior Publication Data

US 2015/0295522 A1   Oct. 15, 2015

(30) Foreign Application Priority Data

Apr. 14, 2014 (JP) .................. 2014-083131
Aug. 21, 2014 (JP) .................. 2014-168655
Mar. 4, 2015 (JP) .................. 2015-042781

(51) Int. Cl.
  *H02P 3/18* (2006.01)
  *H02P 6/08* (2016.01)
  *H02P 23/14* (2006.01)
  *H02P 1/02* (2006.01)
  (Continued)

(52) U.S. Cl.
  CPC ............ *H02P 1/028* (2013.01); *G05B 19/404* (2013.01); *H02P 23/0004* (2013.01); *G05B 2219/25409* (2013.01); *G05B 2219/41426* (2013.01)

(58) Field of Classification Search
  CPC .................... H02P 21/22; H02P 6/16
  See application file for complete search history.

(56) References Cited

U.S. PATENT DOCUMENTS 6,163,735 A   12/2000 Yamada et al.
2005/0067996 A1*  3/2005 Eba .................. G05B 19/19
                                              318/609
(Continued)

FOREIGN PATENT DOCUMENTS

CN    1239538 A    12/1992
CN    1111367 A    11/1995
(Continued)

OTHER PUBLICATIONS

Japanese Office Action for Japanese Patent Application No. JP 2015-042781, dated Jul. 25, 2017, 3 pages.
(Continued)

*Primary Examiner* — Eduardo Colon Santana
*Assistant Examiner* — Charles S Laughlin
(74) *Attorney, Agent, or Firm* — McCarter & English, LLP

(57) ABSTRACT

A compensation function constituting device calculates a correlation coefficient based on a moving distance required for reversing a moving direction of a movable unit and a sliding resistance acting on the movable unit, and a compensation amount output device calculates a moving distance on a position command value required until the movable unit starts to move according to the correlation coefficient and a feedback torque when the moving direction is reversed and increases a torque compensation amount in accordance with the moving distance after reversing the moving direction until the moving distance after the moving direction is reversed reaches the moving distance required until the movement is started.

8 Claims, 9 Drawing Sheets

(51) Int. Cl.
    *H02P 23/00*    (2016.01)
    *G05B 19/404*   (2006.01)

(56) References Cited

U.S. PATENT DOCUMENTS

| | | | | |
|---|---|---|---|---|
| 2008/0169778 A1* | 7/2008 | Eguchi | ............... | G05B 13/042 318/561 |
| 2008/0203959 A1* | 8/2008 | Norihisa | ............. | G05B 19/404 318/630 |
| 2011/0238221 A1* | 9/2011 | Kawazu | ............... | G05B 11/42 700/275 |

FOREIGN PATENT DOCUMENTS

| | | | |
|---|---|---|---|
| CN | 1448815 | A | 10/2003 |
| CN | 1492435 | A | 4/2004 |
| CN | 1574028 | A | 2/2005 |
| CN | 1745352 | A | 3/2006 |
| CN | 1761920 | A | 4/2006 |
| CN | 101727088 | A | 6/2010 |
| CN | 101916085 | A | 12/2010 |
| CN | 102374038 | A | 3/2012 |
| JP | H08-099253 | A | 4/1996 |
| JP | 2001350523 | A | 12/2001 |
| JP | 2005-304155 | A | 10/2005 |
| JP | 2009070396 | A | 4/2009 |

OTHER PUBLICATIONS

Office Action for Chinese Patent Application No. 201510174505.4, dated Apr. 2, 2018, 13 pages.

\* cited by examiner

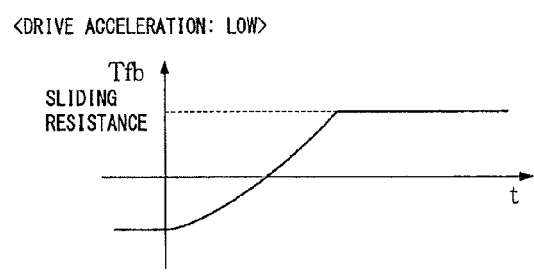
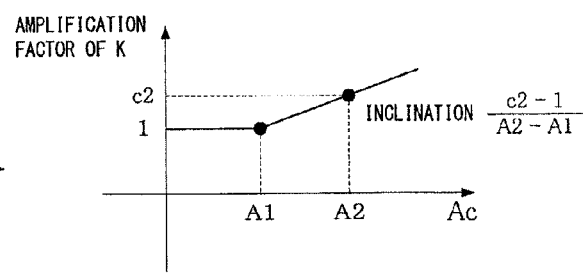
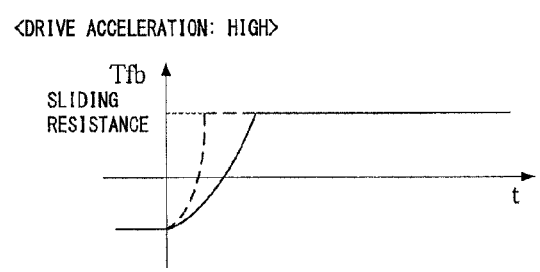
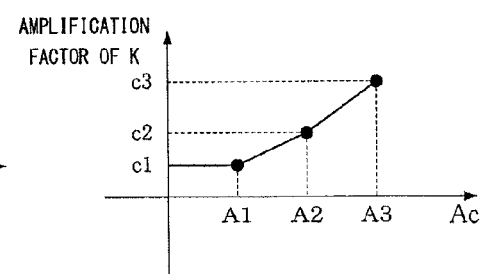
FIG. 7
FIG. 8

POSITION CONTROL DEVICE

CROSS-REFERENCE TO RELATED APPLICATIONS

This application claims priority under 35 U.S.C. § 119 (a)-(d) to Japanese Patent Application No. 2014-083131, filed on Apr. 14, 2014, 2014-168655 filed on Aug. 21, 2014, and 2015-042781 filed on Mar. 4, 2015, which are incorporated herein by reference in their entireties.

FIELD OF THE INVENTION

The present invention relates to a position control device for a feeding shaft of a machine tool, etc., and more particularly to improvement of a position control device which compensates a follow-up delay when reversing a moving direction.

DESCRIPTION OF THE RELATED ART

When the moving direction of the feeding shaft of a machine tool is reversed, a torque response is delayed because a direction of friction application is reversed, and the delay is observed as a follow-up delay with respect to a position command. To reduce the follow-up delay, the following attempts have been made conventionally.

FIG. 12 is a block diagram showing an example of a conventional position control device. In FIG. 12, a subtractor 1 calculates a position deviation Pdif based on a difference between a position command value Pc instructed from a host device (not shown) and a position detected value Pd of a position detector mounted on a motor or a driven body within a target plant 12. The calculated position deviation Pdif is proportionally amplified by a velocity command computing unit (proportional gain Kp) 2 and added with velocity feedforward Vff, which is obtained by differentiating the position command value Pc by a differentiator 3, by an adder 4 to become a velocity command value Vc. Then, a subtractor 5 computes the difference between the velocity command value Vc and a detected velocity value Vd, which is obtained by differentiating the position detected value Pd or directly obtained from the velocity detector mounted within the target plant 12. Proportional amplification and integral amplification are then performed by a torque command computing unit (proportional gain Pv) 6 and a torque command computing unit (integration gain Iv) 7 respectively, and addition is performed by an adder 8 to determine a feedback torque Tfb. In addition, the feedback torque Tfb is added, by an adder 11, with torque feedforward Tff, which is calculated by multiplying motor shaft-converted inertia 10 of a movable unit in the target plant 12 after differentiating the velocity feedforward Vff by a differentiator 9, to become a torque command value Tc. The target plant 12 generates a torque equivalent to the torque command value Tc by a motor in the target plant 12 and drives the driven body provided in the target plant 12 through, for example, a ball screw.

Subsequently, a delay of the torque response when reversing the moving direction is described below. When the driven body is driven in one direction, mainly two kinds of torques are required, one of which is a torque for accelerating and decelerating the driven body, and the other is a torque for moving against a sliding resistance such as friction. In FIG. 12, the former is compensated by the torque feedforward Tff in accordance with a motion equation, and the latter is detected as a follow-up delay of the position detected value Pd to the position command value Pc or as a follow-up delay of the detected velocity value Vd to the velocity command value Vc, and is compensated by the feedback torque Tfb. Especially, when the driven body is moving in accordance with the command, the velocity command value Vc and the detected velocity value Vd are in an almost equal state, and the torque for moving against the sliding resistance is compensated by the output of the torque command computing unit (integration gain Iv) 7.

Here, when a command is issued to the driven body to invert the moving direction, the moving direction of the driven body is reversed, and at the same time, the polarity of the sliding resistance acting on the driven body is also reversed. Therefore, after the moving direction is reversed, the polarity of the torque for moving against the sliding resistance is also reversed, and the polarity of the output of the torque command computing unit (integration gain Iv) 7 is also reversed. Here, if the output of the torque command computing unit (integration gain Iv) 7 can be inverted quickly when the moving direction is reversed, the position deviation Pdif can be reduced. According to the prior art shown in FIG. 12, when a compensation switching unit 51 detects that the moving direction has been reversed, the integration gain Iv is increased, and the output of the torque command computing unit (integration gain Iv) 7 is inverted quickly. The compensation switching unit, which detects the reverse of the moving direction and changes the integration gain Iv as described above, is disclosed in JP2005-304155A, etc.

In order to realize the compensation which is variable depending on the velocity (the drive acceleration) in a tangential direction at the time of circular arc driving, JP2005-304155A determines an increase amount of the integration gain Iv as shown in FIG. 13. In FIG. 13, when a circular arc command velocity is high, the time required to reach a target moving distance for completion of the compensation is short after reversing the moving direction, and an increase amount of the integration gain Iv can be decreased. On the other hand, when the circular arc command velocity is low, the time required to reach the target moving distance for completion of the compensation is long, and the increase amount of the integration gain Iv can be increased. Thus, for various circular arc drive velocities, compensation is realized to invert quickly the output of the torque command computing unit (integration gain Iv) 7.

On the other hand, to achieve compensation for various processing conditions, JPH08-099253A stores compensation patterns in accordance with the presence or absence of a function such as shape error compensation and a circular arc drive velocity, and switches the compensation patterns in accordance with the processing conditions.

The conventional position control device shown in FIG. 12, however, has a possibility of impairing the stability of the control system when reversing the moving direction, because the feedback torque Tfb is quickly inverted by increasing the integration gain Iv. Conversely, it is also possible to reduce in advance the integration gain Iv when driving normally assuming that the integration gain Iv is increased when reversing the moving direction, but this excessively secures a gain margin at the time of normal driving, resulting in lowering the control performance such as a command follow-up characteristic. Also, since an increase amount of the integration gain Iv is specified by a moving distance after the direction is reversed, the same compensation as in the case where the sliding resistance is high is applied even when the sliding resistance lowers, because a sliding surface of a slide guide for guiding the driven body achieves fitness due to, for example, a secular change or the like, resulting in a problem that the compensation becomes excessive, excessive movement such as overshoot is caused, or the driven body's response occasionally becomes vibrational.

In addition, the position control device of JPH08-099253A needs to store a compensation pattern for each processing condition, so that a large storage capacity is required to deal with arbitrary processing conditions. Further, the compensation pattern is required to be set for each processing condition, so that there are problems that lots of time and labor are used, and if a secular change occurs, the compensation pattern must be set again.

The present invention has been achieved to solve the above-described subjects and provides a position control device which can compensate effectively the follow-up delay when reversing the moving direction by a small number of compensation parameters without impairing the stability of the control system and which can optimize the compensation accordingly in response to a secular change such as a change in sliding resistance.

SUMMARY OF THE INVENTION

The position control device of the present invention is a position control device for controlling a position of a movable unit by driving a servo motor in accordance with a position command value from a host device, comprising a velocity command output unit for outputting a velocity command value in accordance with at least the position command value; a feedback torque output unit for outputting a feedback torque in accordance with a torque compensation amount and a value resulting from proportional integral amplification of a deviation between the velocity command value and a detected velocity value of the movable unit; a feedforward torque output unit for outputting a feedforward torque in accordance with the position command value and inertia of the movable unit; a torque command value output unit for outputting a torque command value in accordance with the feedback torque and the feedforward torque; a motor drive unit for driving the servo motor in accordance with the torque command value; a correlation information constituting device for calculating correlation information which indicates a relation between a sliding resistance acting on the movable unit and a moving distance on the position command value from a time when a moving direction reversing command is issued to the movable unit to a time when the movable unit inverts actually and starts to move; and a compensation amount output device for calculating accordingly the torque compensation amount corresponding to the position command value based on the correlation information and the feedback torque when reversing the moving direction of the position command value.

The position control device of the present invention is a position control device for controlling a position of a movable unit by driving a servo motor in accordance with a position command value from a host device, comprising a velocity command output unit for outputting a velocity command value in accordance with at least the position command value; a feedback torque output unit for outputting a feedback torque in accordance with a torque compensation amount and a value resulting from proportional integral amplification of a deviation between the velocity command value and a detected velocity value of the movable unit; a feedforward torque output unit for outputting a feedforward torque in accordance with the position command value and inertia of the movable unit; a torque command value output unit for outputting a torque command value in accordance with the feedback torque and the feedforward torque; a motor drive unit for driving the servo motor in accordance with the torque command value; a correlation information constituting device for calculating correlation information which indicates a relation among a sliding resistance acting on the movable unit, a moving distance on the position command value from a time when a moving direction reversing command is issued to the movable unit to a time when the movable unit inverts actually and starts to move, and drive acceleration; and a compensation amount output device for calculating accordingly the torque compensation amount corresponding to the position command value based on the correlation information and the feedback torque when reversing the moving direction of the position command value.

The position control device according to another aspect of the invention is a position control device for controlling a position of a movable unit by driving a servo motor in accordance with a position command value from a host device, comprising a velocity command output unit for outputting a velocity command value in accordance with at least the position command value and a velocity compensation amount; a feedback torque output unit for outputting, as a feedback torque, a deviation between the velocity command value and a detected velocity value of the movable unit after performing proportional integral amplification; a feedforward torque output unit for outputting a feedforward torque in accordance with the position command value and inertia of the movable unit; a torque command value output unit for outputting a torque command value in accordance with the feedback torque and the feedforward torque; a motor drive unit for driving the servo motor in accordance with the torque command value; a correlation information constituting device for calculating correlation information which indicates a relation between a sliding resistance acting on the movable unit and a moving distance on the position command value from a time when a moving direction reversing command is issued to the movable unit to a time when the movable unit inverts actually and starts to move; a compensation amount output device for calculating accordingly the torque compensation amount corresponding to the position command value based on the correlation information and the feedback torque when reversing the moving direction of the position command value; and a low frequency cutoff filter which has an inverse transfer characteristic of the feedback torque output unit and converts the torque compensation amount into the velocity compensation amount to output the same.

The position control device according to still another aspect of the invention is a position control device for controlling a position of a movable unit by driving a servo motor in accordance with a position command value from a host device, comprising a velocity command output unit for outputting a velocity command value in accordance with at least the position command value and a velocity compensation amount; a feedback torque output unit for outputting, as a feedback torque, a deviation between the velocity command value and a detected velocity value of the movable unit after performing proportional integral amplification; a feedforward torque output unit for outputting a feedforward torque in accordance with the position command value and inertia of the movable unit; a torque command value output unit for outputting a torque command value in accordance with the feedback torque and the feedforward torque; a motor drive unit for driving the servo motor in accordance with the torque command value; a correlation information constituting device for calculating correlation information which indicates a relation among a sliding resistance acting on the movable unit, a moving distance on the position command value from a time when a moving direction reversing command is issued to the movable unit to a time when the movable unit inverts actually and starts to move, and drive acceleration; a compensation amount output device for calculating accordingly the torque compensation amount corresponding to the position command value based on the correlation information and the feedback torque when reversing the moving direction of the position command value; and a low frequency cutoff filter which has an inverse transfer characteristic of the feedback torque output unit and converts the torque compensation amount into the velocity compensation amount to output the same.

According to the above position control devices, it is desirable that the correlation information constituting device outputs, as correlation information, a proportional coefficient between the sliding resistance acting on the movable unit and the moving distance on the position command value until the movement is started; and the compensation amount output device calculates as a predicted moving distance, based on the proportional coefficient and the feedback torque at the time of issuing the moving direction reversing command, the moving distance on the position command value from the time when the moving direction reversing command is issued to the movable unit to the time when the movable unit inverts actually and starts to move, and outputs a torque compensation amount which increases in accordance with an increase in a current moving distance based on the proportional coefficient and the current moving distance until the current moving distance, which is a moving distance on the position command value from the time of issuing the moving direction reversing command, reaches the predicted moving distance.

According to the above position control devices, it is desirable that the correlation information constituting device outputs, as correlation information, a proportional coefficient among the sliding resistance acting on the movable unit, the moving distance on the position command value until the movement is started, and drive acceleration; and the compensation amount output device calculates as a predicted moving distance, based on the proportional coefficient and the feedback torque at the time of issuing the moving direction reversing command, the moving distance on the position command value from the time when the moving direction reversing command is issued to the movable unit to the time when the movable unit inverts actually and starts to move, and outputs a torque compensation amount which increases in accordance with an increase in the current moving distance based on the proportional coefficient and the current moving distance until the current moving distance, which is a moving distance on the position command value from the time of issuing the moving direction reversing command, reaches the predicted moving distance.

The position control device of the present invention can compensate effectively the follow-up delay when reversing the moving direction by a small number of compensation parameters without impairing the stability of the control system. Further, the compensation can be optimized accordingly in response to a secular change such as a sliding resistance change.

BRIEF DESCRIPTION OF THE DRAWINGS

Preferred embodiments of the present invention will be described in detail with reference to the following figures, wherein:

FIG. 7 is a view showing time responses of a feedback torque and a sliding resistance;

FIG. 8 is a view showing a relation between the drive acceleration and an amplification factor of a correlation coefficient K;

DETAILED DESCRIPTION OF THE INVENTION

Embodiments of the invention are described below with reference to the drawings.

Embodiment 1

Figure 1:
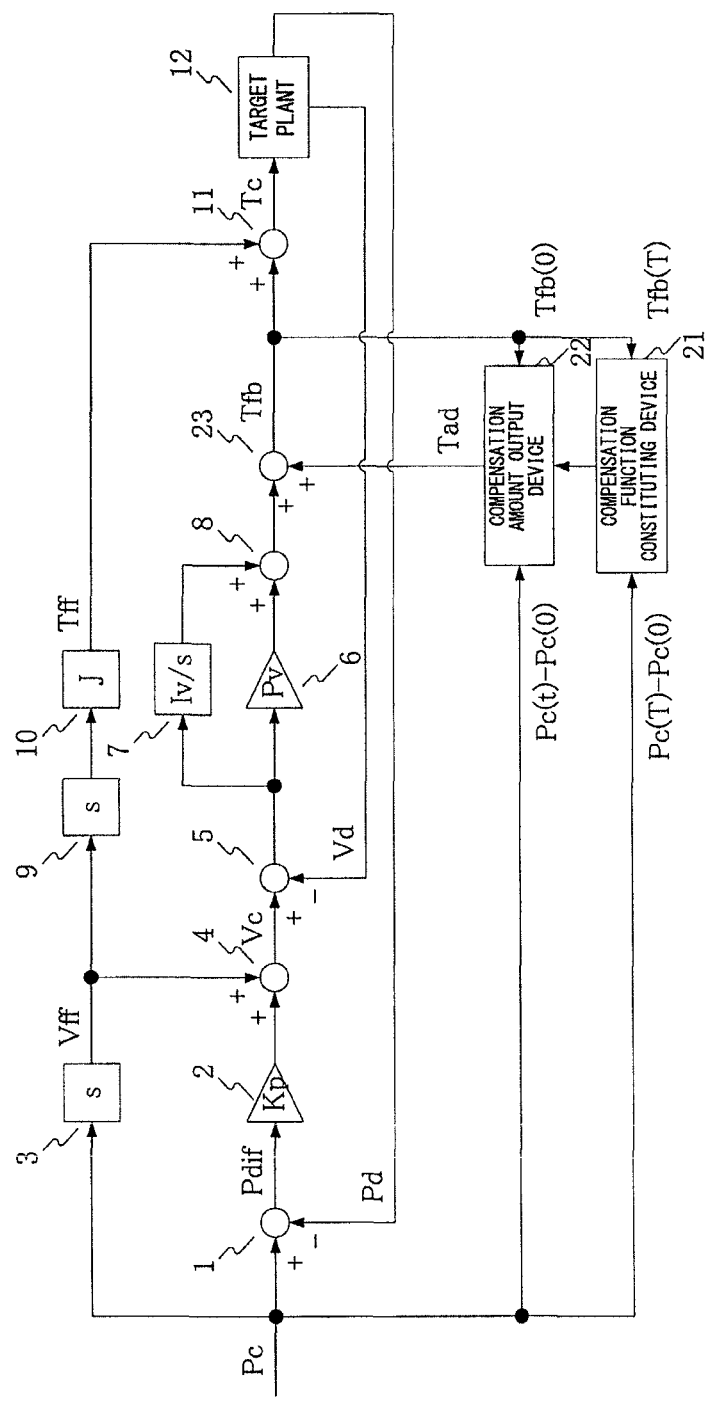
FIG. 1 is a block diagram showing an embodiment of the present invention.

FIG. 1 is a view showing a control block related to a first embodiment of the invention. The same elements as those in the prior art are denoted by like reference numerals, and their descriptions will be omitted. A compensation function constituting device 21 functions as a correlation information constituting device that outputs a correlation coefficient K as correlation information which indicates a relation between a sliding resistance acting on a movable unit and a moving distance on a position command value from the issuance of a reverse command to the start of movement of the movable unit after reversing actually. Specifically, the compensation function constituting device 21 determines that a timing when the position command value Pc is inverted is time t=0 and a timing when the movable unit really starts to make a reverse movement is time t=T with a torque outputted so that the feedback torque Tfb moves against the sliding resistance and calculates the correlation coefficient K, which is used when the moving direction is reversed next time and later, based on a value Tfb(T) of the feedback torque Tfb at the time T and a moving distance $D(T)=Pc(T)-Pc(0)$ on the position command value between the moving direction reversing time (time 0) and the time T. As described later in detail, the value Tfb(T) can be regarded as a sliding resistance acting on the movable unit, and the correlation coefficient K is a proportional coefficient between the sliding resistance (Tfb(T)) and the moving distance D(T) on the position command value (i.e., resulting in $Tfb(T)=K \times D(T)$).

On the other hand, a compensation amount output device 22 determines a torque compensation pattern based on the correlation coefficient K calculated by the compensation function constituting device 21 in the previous (past) time of reversing the moving direction and a value Tfb(0) of the feedback torque Tfb at the present time (time t=0) of reversing the moving direction, and outputs a torque compensation amount Tad corresponding to a moving distance $D(t)=Pc(t)-Pc(0)$ from the time of reversing the moving direction to the present time. As described later, the torque compensation amount Tad is a variable value which is varied in accordance with the position command value Pc(t)(resulting in a moving distance D(t)); namely, $Tad(t)=K \times D(t)$. In addition, the torque compensation amount Tad outputted from the compensation amount output device 22 is added with the output of an adder 8 by an adder 23 to constitute the feedback torque Tfb.

The torque compensation pattern for calculation of the torque compensation amount Tad is described below. If the compensation is not performed when reversing the moving direction, the feedback torque Tfb and the position deviation Pdif show the characteristics indicated by the solid lines in FIG. 2. When the polarity of a command velocity (velocity feedforward Vff) is reversed from negative to positive, the driven body stops temporarily. Immediately after stopping, the driven body is desired to move in an opposite direction but falls in a state that it cannot start to move because a sufficient torque to resist the sliding resistance, which is generated when moving in the opposite direction, is not outputted. At this time, the position command value Pc generates a command to move in the opposite direction, but since the position detected value Pd remains stopped, the position deviation Pdif increases gradually. Accordingly, the feedback torque Tfb also starts to invert. Also, when the feedback torque Tfb reaches the sliding resistance which is generated when moving in the opposite direction, the driven body and the position detected value Pd start to move, and the position deviation Pdif changes to decrease. After the position deviation Pdif changes to decrease, the feedback torque Tfb scarcely changes, and the torque for moving against the sliding resistance is generated continuously.

A response in the case where the integration gain Iv of a torque command computing unit (integration gain Iv) 7 is increased is described below. As the integration gain Iv becomes larger, the characteristic is indicated by the broken line shown in FIG. 2, and when it is increased furthermore, the characteristic is indicated by the dot-and-dash line. In other words, when the integration gain Iv is increased, large output can be obtained even when a velocity deviation is small, so that the time in which the feedback torque Tfb reaches the sliding resistance decreases. As a result, the position deviation Pdif can be reduced, and ideally, when the integration gain Iv is increased infinitely, the position deviation Pdif can be reduced without limit. However, when the integration gain Iv is increased, the stability of the control system might be impaired when reversing the moving direction as described above. Therefore, it is considered that the feedback torque Tfb, which is equivalent to the case where the integration gain Iv is increased without increasing the integration gain Iv, is outputted.

When reversing the moving direction, the influence of the velocity feedforward Vff becomes dominant and the velocity command value Vc changes in a ramp function shape. On the other hand, the detected velocity value Vd becomes zero because the driven body stops temporarily. Therefore, the velocity deviation calculated by a subtractor 5 changes in the ramp function shape similar to the velocity command value Vc. On the other hand, when the integration gain Iv is increased, a dependency of the feedback torque Tfb on the output of the torque command computing unit (integration gain Iv) 7 becomes dominant in comparison with the output of a torque command computing unit (proportional gain Pv) 6. Therefore, when the velocity deviation changes in the ramp function shape, the feedback torque Tfb can be considered to change in a velocity deviation integrated function; namely, in a quadratic function shape.

Therefore, as the torque compensation amount Tad, it is considered to perform feedforward of a torque which changes to a quadratic function shape after reversing the moving direction. In addition, since the change in the feedback torque Tfb saturates when reaching the torque for moving against the sliding resistance, it is also determined to saturate the torque compensation amount Tad when reaching the torque for moving against the sliding resistance. The magnitude of the sliding resistance varies due to a secular change or drive acceleration, but since a variation amount in a very short time of dozens of milliseconds by a moving direction reversing operation is very small, a value assumed from the value Tfb(0) of the feedback torque Tfb when reversing the moving direction (t=0); namely, −Tfb(0), with the polarity reversed, is adopted as a torque for moving against the sliding resistance.

Thus, under the situation where the velocity command value Vc changes in the ramp function shape, a torque compensation pattern can be defined so that a time response of the torque compensation amount Tad draws a characteristic that changes from Tfb(0) in a quadratic function shape and saturates with −Tfb(0).

Figure 2:
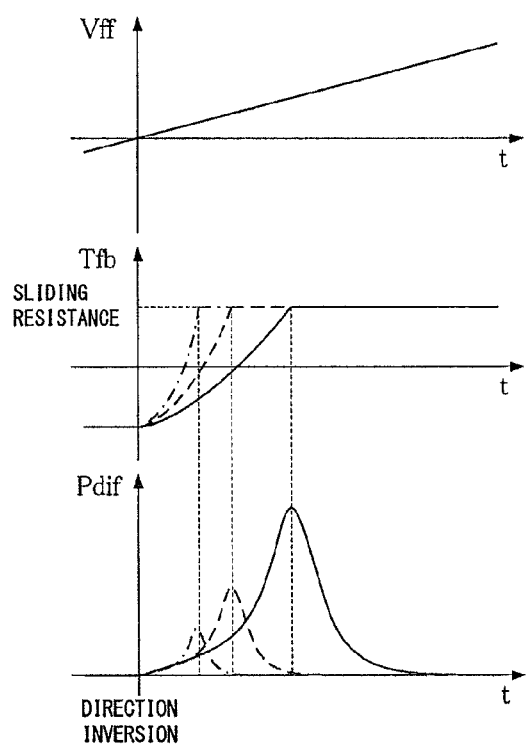
FIG. 2 is a view showing a change in a control response when a compensation parameter is changed.

For example, when the torque compensation amount Tad of the response indicated by the solid line in the graph of the feedback torque Tfb of FIG. 2 is added according to the above torque compensation pattern, the sliding resistance, which was conventionally compensated by the command computing unit (integration gain Iv) 7, is covered by the torque compensation amount Tad, and the command computing unit (integration gain Iv) 7 outputs the compensation amount in order to suppress the position deviation Pdif. As a result, the feedback torque Tfb and the position deviation Pdif have characteristics indicated by the broken lines. When the torque compensation amount Tad of the response indicated by the broken line is then added as the torque compensation amount Tad in the graph of the sliding resistance Tfb of FIG. 2, the feedback torque Tfb and the position deviation Pdif have characteristics indicated by the dot-and-dash line, and the same effect can be obtained without increasing the integration gain Iv.

A response when the drive acceleration is varied is described below. Originally, when the drive acceleration is varied, the magnitude of the sliding resistance also changes, but for simplification, it is assumed here that the magnitude of the sliding resistance does not change even if the drive acceleration is varied.

Figure 3:
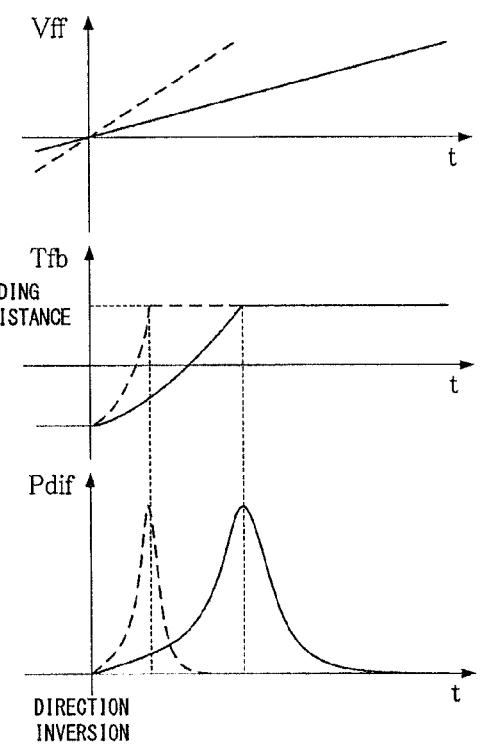
FIG. 3 is a view showing a change in a control response when drive acceleration is varied.

FIG. 3 is a view showing time response characteristics of the feedback torque Tfb and the position deviation Pdif when the drive acceleration is varied. When the drive acceleration is increased, all of the velocity feedforward Vff, the velocity command value Vc, and the velocity deviation have a large value in a short time. In the upper half of FIG. 3, the solid line indicates the velocity feedforward Vff before an increase in drive acceleration, and the broken line indicates the velocity feedforward Vff after the increase in drive acceleration. When the drive acceleration is increased, the output of the torque command computing unit (integration gain Iv) 7 and the feedback torque Tfb also have large values in a short time and reach a torque for moving against the sliding resistance in a short time. That is, it is also necessary to shorten a time in which the torque compensation amount Tad changes to the quadratic function shape.

Here, when the driven body has undergone the circular arc drive at an amplitude P0 and a peripheral velocity V0 with coordinates (P0, 0) at the center, a position P (in direction X), a velocity V, and acceleration A can be expressed as functions by Equation 1, Equation 2, and Equation 3, respectively. The velocity V can be derived by differentiating the position P with respect to the time t, and the acceleration A can be derived by differentiating the velocity V with respect to the time t. Then, before and after reversing the moving direction (time t=0), Equation 1, Equation 2, and Equation 3 can be approximated as Equation 4, Equation 5, and Equation 6, respectively.

$$P=P0-P0 \cdot \cos\{(V0/P0)t\} \qquad \text{Equation 1}$$

$$V=V0 \cdot \sin\{(V0/P0)t\} \qquad \text{Equation 2}$$

$$A=(V0^2/P0) \cdot \cos\{(V0/P0)t\} \qquad \text{Equation 3}$$

$$P \approx (1/2) \cdot (V0^2/P0)t^2 \qquad \text{Equation 4}$$

$$V \approx (V0^2/P0)t \qquad \text{Equation 5}$$

$$A \approx (V0^2/P0) \qquad \text{Equation 6}$$

Equation 4 can be derived by performing the Taylor expansion of Equation 1 up to a secondary term with t=0, Equation 5 can be derived by performing the Taylor expansion of Equation 2 up to a primary term with t=0, and Equation 6 can be derived by performing the Taylor expansion of Equation 3 up to the zero order term with t=0. Equations 5 and 6 can also be derived by differentiating similar to the cases of Equations 2 and 3. That is, the velocity V of Equation 5 corresponds with a case which is derived by differentiating the position P of Equation 4 with respect to the time t, and the acceleration A of Equation 6 corresponds with a case which is derived by differentiating the velocity V of Equation 5 with respect to the time t. Equation 4 to Equation 6 are equivalent to the equation of the case of performing a uniformly accelerated motion with acceleration A=(V0²/P0) at the time t that can be calculated from Equation 3. Also, Equation 7 can be derived from Equations 4 and 6, and when it is solved for the time t, Equation 8 can be obtained.

$$P \approx (1/2) \cdot At^2 \qquad \text{Equation 7}$$

$$t \approx \sqrt{(2P/A)} \qquad \text{Equation 8}$$

Equation 8 means that when the drive acceleration A is doubled, the time required for moving the same distance is shortened to 1/√2 times and also means that the time in which the feedback torque Tfb reaches a torque for moving against the sliding resistance is shortened to 1/√2 times.

Therefore, for the torque compensation pattern of the torque compensation amount Tad, it is determined to calculate a value of torque compensation amount Tad(t) in a section changing in a quadratic function shape in a time domain, in which the torque compensation amount Tad changes from Tfb(0) to −Tfb(0) after reversing the moving direction, by multiplying the moving distance D(t)=Pc(t)−Pc(0) on the position command value from the time of reversing the moving direction by the correlation coefficient K. That is, the torque compensation amount Tad is expressed as indicated by Equation 9.

$$Tad(t)=K\{Pc(t)-Pc(0)\}=K \cdot D(t) \qquad \text{Equation 9}$$

In a case where the driven body performs circular arc driving and it can be represented that it performs uniform acceleration driving before and after the moving direction is reversed, the term Tad(t) of Equation 9 can be expressed as a function which changes in the quadratic function shape with respect to the time t as indicated by Equation 10, by using Equation 7.

$$Tad(t)=K\{(1/2) \cdot At^2\} \qquad \text{Equation 10}$$

Even if the drive acceleration is varied immediately after reversing the moving direction, it is possible to compensate appropriately by specifying the torque compensation amount Tad using the moving distance from the time of reversing the moving direction as indicated by Equation 9.

A response when the magnitude of the sliding resistance is varied will be described below. The magnitude of the sliding resistance is variable depending on a secular change or the like and is also variable depending on the drive velocity. Especially, the magnitude of the sliding resistance is varied by not only the present drive velocity only but also a past drive velocity. For example, when moving at a very slow velocity, a large load is applied to a sliding surface of a slide guide, because the driven body moves against the oil on an oil film surface, but the load becomes small when moving at a high velocity by sliding on the oil film surface. Also, when the driven body moving at the high velocity is suddenly decelerated to move at a very low velocity, the applied load is small immediately after starting to move at the very low velocity, but the magnitude of the load increases gradually over time.

Figure 4:
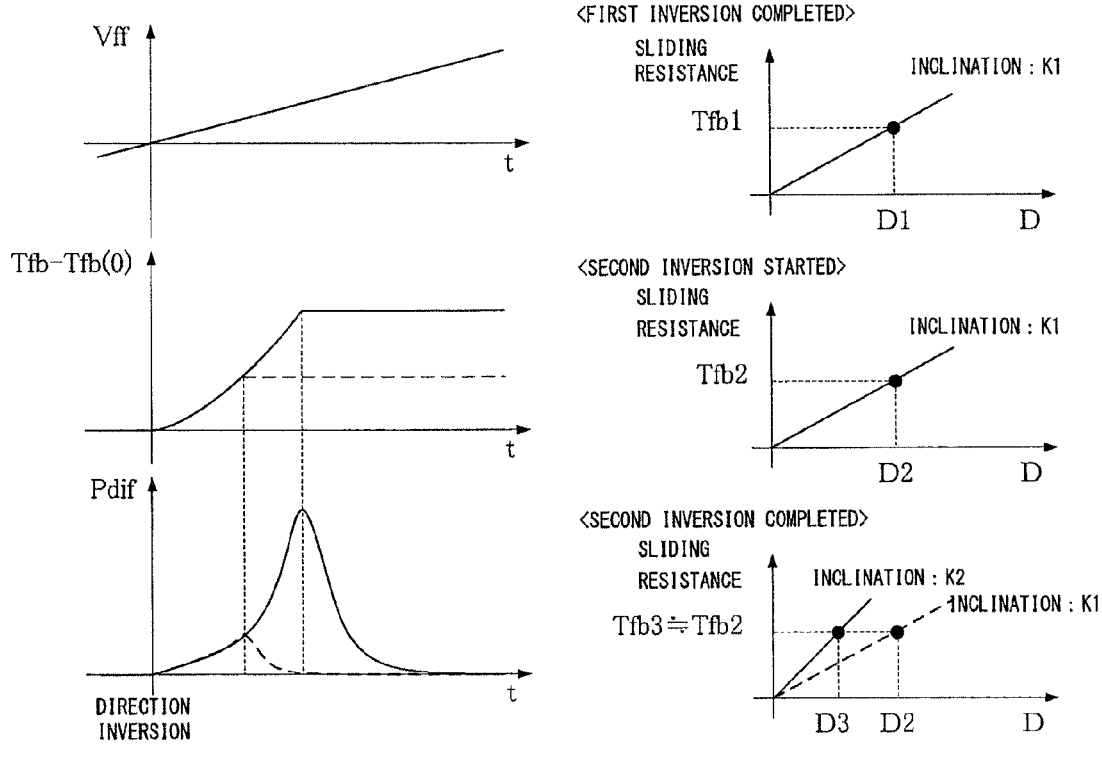
FIG. 4 is a view showing a change in a control response when a sliding resistance is varied.

FIG. 4 is a view showing time response characteristics of the feedback torque Tfb and the position deviation Pdif when the driven body is driven by the same drive acceleration and the magnitude of the sliding resistance is different. FIG. 4 shows that the size of the feedback torque Tfb is determined to be zero when reversing the moving direction.

When the sliding resistance decreases, the feedback torque Tfb and the position deviation Pdif vary as indicated by the broken line in FIG. 4 in comparison with the characteristic indicated by the solid line in FIG. 4. That is, when the sliding resistance decreases, the driven body and the position detected value Pd start to move, and the torque required until the position deviation Pdif changes to decrease becomes small. As a result, when the sliding resistance is small, the time response characteristic similar to the case where the sliding resistance is large is shown until the torque for moving against the sliding resistance is reached, and when the torque for moving against the sliding resistance is reached, the feedback torque Tfb is saturated, and the position deviation Pdif changes to decrease. Therefore, to compensate properly, it is necessary to know the magnitude of the sliding resistance with certain accuracy, and the value Tfb(0) of the feedback torque Tfb when reversing the moving direction is determined to be the above value in this invention. The magnitude of the sliding resistance can be substituted by a value resulting from the addition of the torque compensation amount Tad and the output of the torque command computing unit (integration gain Iv) 7, and it can also be substituted by presuming the magnitude of the sliding resistance by, for example, a disturbance observer.

Figure 5:
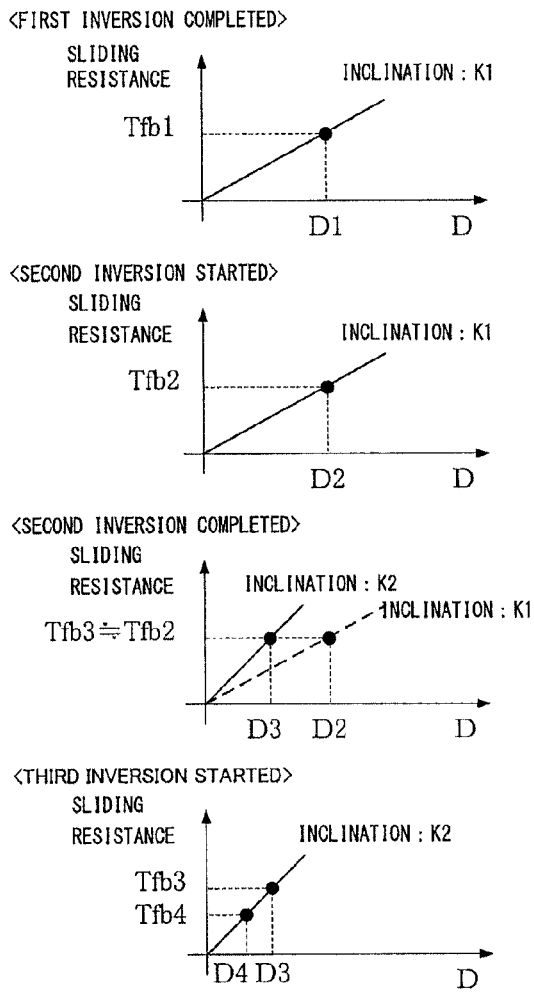
FIG. 5 is a view showing a correlation coefficient determination method of the present invention.

Based on the above, the operation of FIG. 1 is described with reference to FIG. 5. FIG. 5 is a view showing a determination method for the correlation coefficient K outputted by the compensation function constituting device 21 and a reference method of the compensation amount output device 22.

First, it is assumed that a compensation amount for the torque compensation amount Tad is zero and the moving direction of the driven body is reversed to obtain the characteristic indicated by the solid line in FIG. 2. When the reverse of the moving direction is detected, the counting of the time t is started. The compensation function constituting device 21 calculates, as a moving distance D1, a moving distance D(T)={Pc(T)−Pc(0)} on a position command value from a time of issuing a moving direction reversing command to the movable unit to a time of the movable unit starting to move after actually reversing (i.e., from time t=0 to t=T). The value Tfb(T) of the feedback torque Tfb at the time T is also measured as a sliding resistance Tfb1. Then, the relevant point is plotted as shown in a first column of FIG. 5, the straight inclined line K1 passing through the relevant point and an origin is calculated, and the value of the K1 is outputted as the correlation coefficient to the compensation amount output device 22.

After the first reversing process is completed, a time counter is reset to t=0. When the compensation amount output device 22 detects a second moving direction reversing command from the position command value Pc, time counting is restarted. When the moving direction reversing command is detected, the compensation amount output device 22 detects the value Tfb(0) of the feedback torque Tfb when reversing the moving direction (time t=0). In addition, a sliding resistance Tfb2 acting on the movable unit at a second reversing time is set to a value with the polarity of Tfb(0) reversed; namely, is set to Tfb2=−Tfb(0). At this time, as shown in a second column of FIG. 5, a value of a moving distance on the position command value corresponding to the sliding resistance Tfb2 is read as a predicted moving distance D2 from the straight line having an inclination K1 obtained at the first time of reversing the moving direction. This predicted moving distance D2 is a moving distance after reversing at the time when the torque compensation amount Tad is saturated.

Therefore, the compensation amount output device 22 increases the compensation amount Tad(t) according to Equation 9 or Equation 10 until the moving distance D(t)=Pc(t)−Pc(0) at the current time on the position command value after the second reversing of the moving direction reaches the predicted moving distance D2 after the reversing. Here, K1 is used as the correlation coefficient K in Equation 9 or Equation 10. When the moving distance D(t) reaches the predicted moving distance D2, the compensation amount Tad at the reached time is outputted after that. Therefore, for example, when a current moving distance D(ta) reaches the predicted moving distance D2 (if D(ta)=D2) at time t=ta, Tad(ta) is outputted as a torque compensation amount at the time to and later.

Thus, the torque compensation amount Tad(t) is applied by the second moving direction reversing operation as indicated by the solid line in FIG. 2, so that the feedback torque Tfb increases the reversing operation as indicated by the broken line in FIG. 2. Therefore, the compensation function constituting device 21 calculates a moving distance D3={Pc(T)−Pc(0)} on the position command value from the time when the moving direction reversing command is issued by the second moving direction reversing operation to the time when the movable unit actually inverts and starts to move (from time t=0 to t=T). In addition, the value Tfb(T) of the feedback torque Tfb at the time T is measured as Tfb3. Then, the relevant point is plotted as shown in a third column of FIG. 5, a straight inclined line K2 passing through the relevant point and the origin is calculated, and the value of the K2 is outputted as the correlation coefficient K to the compensation amount output device 22. As described before, the Tfb3 is a value having the polarity of Tfb(0) reversed; namely, is almost equal to Tfb2 (Tfb3≈qfb2).

When the second reversing process is completed, the time counter is reset to t=0. When the start of third reversing is detected, time counting is started. In the third reversing of the moving direction, the above calculated correlation coefficient K2 is used to calculate the torque compensation amount Tad by the compensation amount output device 22. Here, an example is described supposing that the sliding resistance is reduced. Upon detecting a third moving direction reversing command from the position command value Pc, the compensation amount output device 22 detects the value Tfb(0) of the feedback torque Tfb when reversing the moving direction, and determines the sliding resistance value after the reversing as Tfb4≈Tfb(0). At this time, a predicted moving distance D4 after the reversing and corresponding to the Tfb4 is read as shown in a fourth column of FIG. 5. Since the sliding resistance is reduced, the predicted moving distance D4 after the reversing has a value which is smaller than a second moving distance D3 (the third column of FIG. 5). The read value is determined as a moving distance on the position command value after the reversing when the torque compensation amount Tad is saturated, and the torque compensation pattern is decided. After that, when the moving direction is reversed similarly, the compensation amount is increased in accordance with Equation 9 or Equation 10 until the position command value Pc is changed by the moved distance after the above reversing, and when the moved distance after the above reversing is reached, the torque compensation amount Tad is outputted so that the compensation amount is kept. Here, K2 is used as the correlation coefficient K in Equation 9 or Equation 10.

Here, the compensation function constituting device 21 needs to detect a time (time T) when the feedback torque Tfb comes to output a torque for moving against the sliding resistance, and this detection can be realized by detecting an inflection point of the feedback torque Tfb or detecting a maximum value update timing of the position deviation Pdif.

It is also possible to define the correlation coefficient K for each reversing direction, and in cases where the polarity of the command velocity (velocity feedforward Vff) is reversed from negative to positive and vice versa, the correlation coefficient K is determined individually and can be used for calculation of the torque compensation amount Tad for each reversing direction.

As described above, the position control device of the present invention can perform compensation, which is adapted to the secular change such as a sliding resistance change, of the follow-up delay when reversing the moving direction without impairing the stability of the control system. In addition, the position control device has, as a compensation parameter, only the correlation coefficient between the moved distance after the reversing and the feedback torque, and the compensation parameter can be simplified.

Embodiment 2

Figure 6:
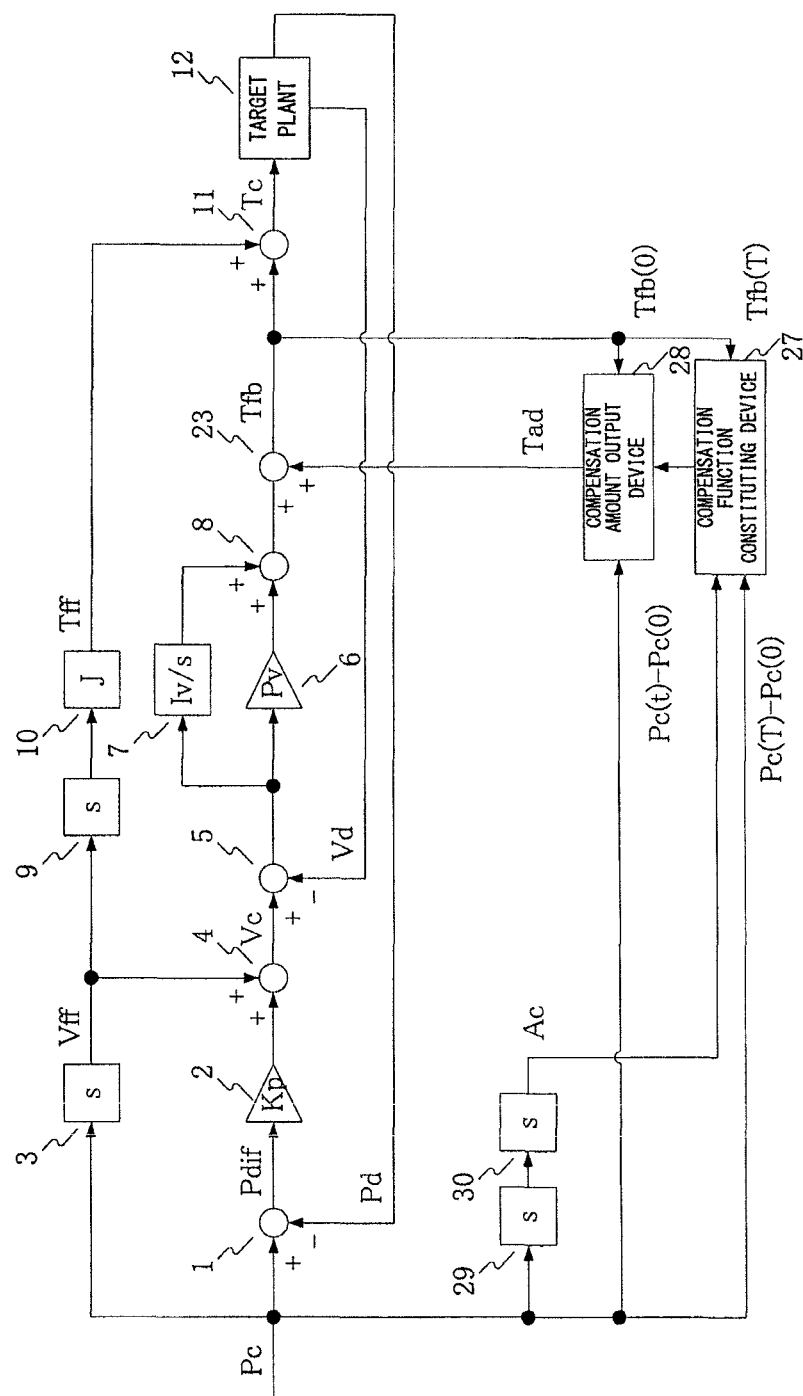
FIG. 6 is a block diagram showing another embodiment of the present invention.

FIG. 6 is a view showing a control block related to a second embodiment of the present invention. The same elements as those in the prior art and the first embodiment are denoted by like reference numerals, and their descriptions will be omitted. A compensation function constituting device 27 functions as a correlation information constituting device that outputs a correlation coefficient K as correlation information which indicates a relation among a sliding resistance acting on a movable unit, a moving distance D(t)-Pc(t)-Pc(0) on a position command value, and command acceleration Ac. A compensation amount output device 28 outputs the torque compensation amount Tad based on the correlation coefficient K calculated by the compensation function constituting device 27, the feedback torque Tfb(0), and the moving distance D(t) on the position command value.

As described above, the magnitude of the sliding resistance is varied according to the drive acceleration. Therefore, to compensate the follow-up delay appropriately, it is necessary to know the magnitude of the sliding resistance with certain accuracy. In the structure of the first embodiment, however, the estimation accuracy of the sliding resistance depends largely on the torque command computing unit (integration gain Iv) 7, and when the drive acceleration becomes high, a sliding resistance estimation delay occurs, resulting in increasing a number of attempts for the correlation coefficient K until appropriate compensation is performed.

On the other hand, when the compensation is performed with the correlation coefficient K varied depending on the drive acceleration, the torque compensation amount Tad can be amplified or attenuated while considering the estimation delay. Therefore, the number of attempts until the compensation is performed appropriately can be decreased.

FIG. 7 is a view showing the time responses of the feedback torque Tfb and the sliding resistance. In FIG. 7, the solid line indicates the feedback torque and the dotted line indicates the sliding resistance. When the drive acceleration is low, the sliding resistance and the feedback torque almost correspond with each other as indicated in the upper half of FIG. 7, and the sliding resistance can be presumed with high accuracy. However, if the drive acceleration is high, the feedback torque has a delay with respect to the sliding resistance as indicated in the lower half of FIG. 7. Therefore, the torque compensation pattern falls in a non-compensated state, and the number of attempts required to provide an optimum torque compensation pattern described above increases. As to the magnitude of the sliding resistance, the estimation accuracy can also be improved by substituting with the disturbance observer or the like as described above, but the estimation delay problem cannot be avoided substantially.

FIG. 8 is a view showing a relation between the drive acceleration Ac and an amplification factor of K. In FIG. 8, an amplification factor 1 means that the correlation coefficient K, which is calculated by a determination method for the correlation coefficient K described before, is used as is. If the drive acceleration Ac is lower than drive acceleration A1, the amplification factor is determined to be 1, and if the drive acceleration Ac is higher than the drive acceleration A1, proportional amplification is performed in accordance with the drive acceleration, so that the torque compensation can be increased in consideration of a follow-up delay of the feedback torque. The drive acceleration A1 and the inclination of amplification factor (c2−1)/(A2−A1) are described below. The drive acceleration A1 with which the feedback torque Tfb can follow the sliding resistance is determined from the integration gain Iv. Also, the amplification factor c2 with the drive acceleration A2 is determined based on the number of attempts N with which the peak value of the position deviation Pdif becomes a predetermined target value or below or becomes a target magnification or below with respect to a peak value Pdif1 of the position deviation in a situation where the torque compensation amount is zero.

For example, if the number of attempts N is 4, it is calculated as c2=2 using Equation 11.

$$c2=\sqrt{i(N)} \qquad \text{Equation 11}$$

In this case, the amplification factor c2 is calculated using the square root of the number of attempts, but in order to improve the convergency of the position deviation Pdif, calculation may be performed by multiplying the number of attempts N by the coefficient or by multiplying a natural logarithm of the number of attempts N by the coefficient. That is to say, the amplification factor c2 is expressed by Equation 12.

$$c2=\sqrt{(N)} \qquad \text{Equation 12}$$

The amplification factor of K can also be calculated by calculating the amplification factors c1, c2, c3, . . . of K with respect to arbitrary drive accelerations A1, A2, A3, . . . as shown in the lower half of FIG. 8 and performing linear interpolation of the amplification factor among the drive accelerations. In this case, the number of samples of the drive accelerations increases in the example of the upper half of FIG. 8, but it becomes possible to improve the convergency of the position deviation Pdif regardless of the drive acceleration. The interpolation method for the amplification factor among the drive accelerations is not limited to linear interpolation, but parabolic interpolation, spline interpolation, or the like may alternatively be used.

As described above, the position control device of the present invention can perform compensation, which is adapted to the secular change such as a sliding resistance change, of the follow-up delay when reversing the moving direction without impairing the stability of the control system. In addition, the position control device has, as a compensation parameter, only the correlation coefficient among the drive acceleration, the moved distance after reversing, and the feedback torque, and the compensation parameter can be simplified. The compensation amount is converged to an appropriate value by a small number of attempts.

Embodiment 3

Figure 9:
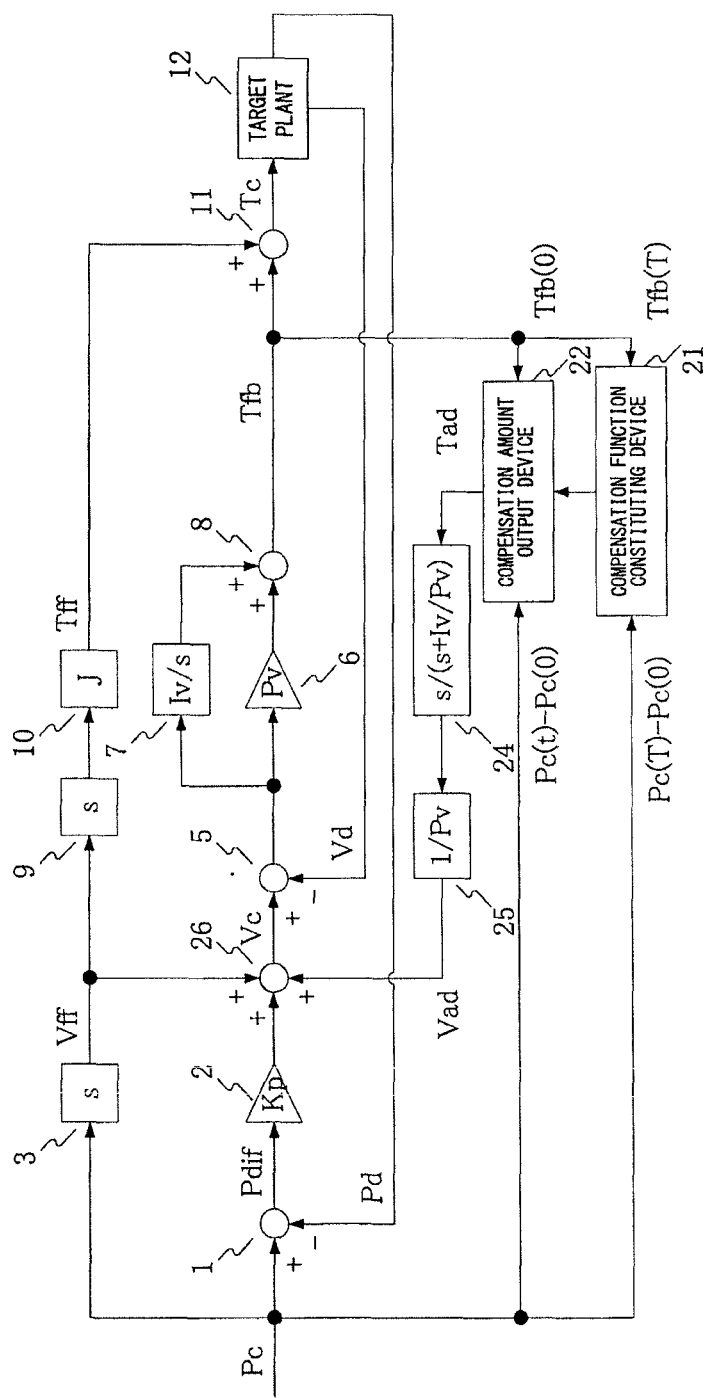
FIG. 9 is a block diagram showing an embodiment of the present invention.

FIG. 9 is a view showing a control block related to a third embodiment of the present invention. The same elements as those in the prior art and the first embodiment are denoted by like reference numerals, and their descriptions will be omitted. In FIG. 9, the compensation amount output device 22 outputs the torque compensation amount Tad corresponding to the moving distance D(t)=Pc(t)−Pc(0) on the position command value similar to the first embodiment. The torque compensation amount Tad outputted from the compensation amount output device 22 is converted into the velocity compensation amount Vad via a low frequency cutoff filter 24 and a conversion gain 25. Here, a transfer function of the control block comprising the low frequency cutoff filter 24 and the conversion gain 25 has an inverse transfer characteristic of the torque command computing unit (proportional gain Pv) 6 and the torque command computing unit (integration gain Iv) 7. Also, the velocity compensation amount Vad outputted from the conversion gain 25 is added with the output of the velocity command computing unit (proportional gain Kp) 2 and the velocity feedforward Vff by an adder 26 to constitute the velocity command value Vc.

The torque compensation amount Tad outputted by the compensation amount output device 22 is converted into the velocity compensation amount Vad and reconverted into a value equivalent to the original torque compensation amount Tad by the torque command computing unit (proportional gain Pv) 6 and the torque command computing unit (integration gain Iv) 7, so that a reversal of the feedback torque Tfb can be quickened, similar to the case of the first embodiment.

In the structure of the first embodiment, however, it is necessary to continuously output the torque compensation amount Tad after reversing the moving direction, because the torque for moving against the sliding resistance is compensated by the torque compensation amount Tad. When the torque for moving against the sliding resistance is compensated by the torque compensation amount Tad, it is desirable that to provide for compensation at the next reversing of the moving direction, and the value of the torque compensation amount Tad is variable in accordance with the magnitude of an actual sliding resistance.

On the other hand, in a case where compensation is performed by converting the torque compensation amount Tad into the velocity compensation amount Vad, the necessity of continuously outputting the compensation amount can be eliminated by the effect of the low frequency cutoff filter 24. As a result, the necessity of reflecting the change of the sliding resistance on the torque compensation amount Tad is eliminated.

Figure 10:
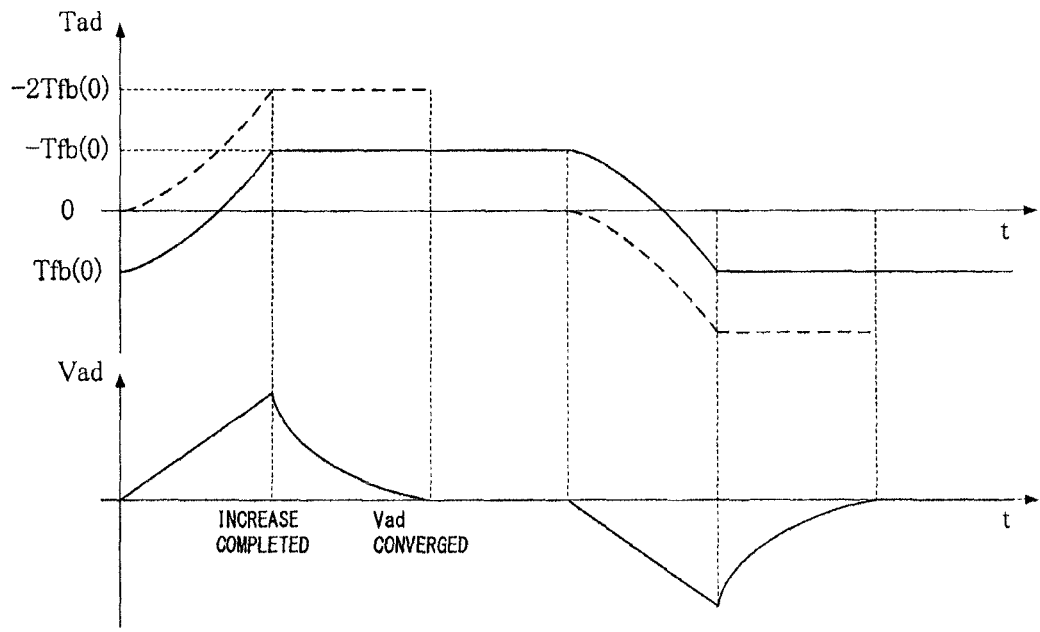
FIG. 10 is a view showing a time response of a compensation amount according to the present invention.
Figure 13:
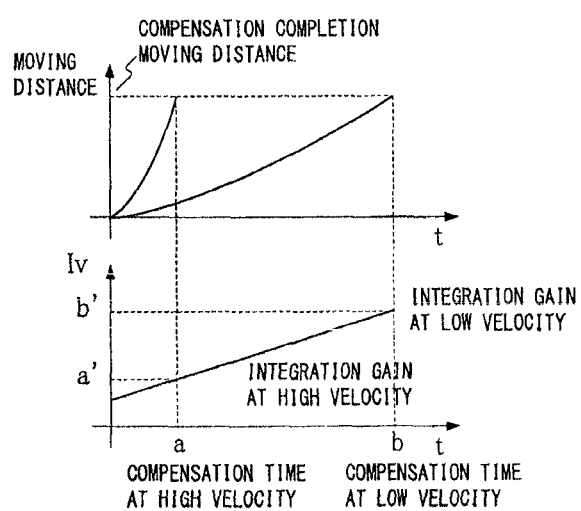
FIG. 13 is a view showing a compensation parameter determination method according to the prior art.

FIG. 10 is a view showing the time response waveforms of the torque compensation amount Tad and the velocity compensation amount Vad. As indicated by the solid line in the upper half of FIG. 10, when the torque compensation amount Tad is outputted, the velocity compensation amount Vad increases continuously while the torque compensation amount Tad increases in proportion to the moving distance after the reversing, and after the torque compensation amount Tad has become a constant value, the velocity compensation amount Vad converges to zero. Therefore, when it is operated to hold the output of the velocity compensation amount Vad to be zero at the timing when the velocity compensation amount Vad converges to zero, the output of the torque compensation amount Tad can be stopped and in addition, it becomes possible to configure the torque compensation amount Tad as indicated by the dotted line in the upper half of FIG. 10. That is, the torque compensation amount Tad is increased not from the value Tfb(0) of the feedback torque Tfb when reversing the moving direction to −Tfb(0) but from the compensation amount when reversing the moving direction is determined to be zero and increased to −2Tfb(0). Even when the torque compensation amount Tad is configured as described above, a DC component of the torque compensation amount Tad is cut by the effect of the low frequency cutoff filter 24, so that there can be obtained the velocity compensation amount Vad, which is similar to the case that the torque compensation amount Tad indicated by the solid line in FIG. 10 is configured.

The torque compensation amount Tad is converted into the velocity compensation amount Vad to perform compensation, and an operation of holding the output of the velocity compensation amount Vad to be zero at the timing when the velocity compensation amount Vad is converged to zero is further added. Therefore, the torque for moving against the sliding resistance is compensated by the torque command computing unit (integration gain Iv) 7. For example, even when the drive velocity while moving in the same direction is varied and the sliding resistance is varied, its output is suitably adjusted by the torque command computing unit (integration gain Iv) 7, so that it is not necessary to reflect the change in the sliding resistance on the torque compensation amount Tad.

As described above, the position control device of the present invention can perform compensation, which is adapted to the secular change such as the sliding resistance change, of the follow-up delay when reversing the moving direction without impairing the stability of the control system. In addition, the position control device has, as a compensation parameter, only the correlation coefficient between the moved distance after reversing and the feedback torque, and the compensation parameter can be simplified. Furthermore, a suitable compensation amount can always be compensated when reversing the moving direction without varying the compensation amount in accordance with the sliding resistance change.

Embodiment 4

Figure 11:
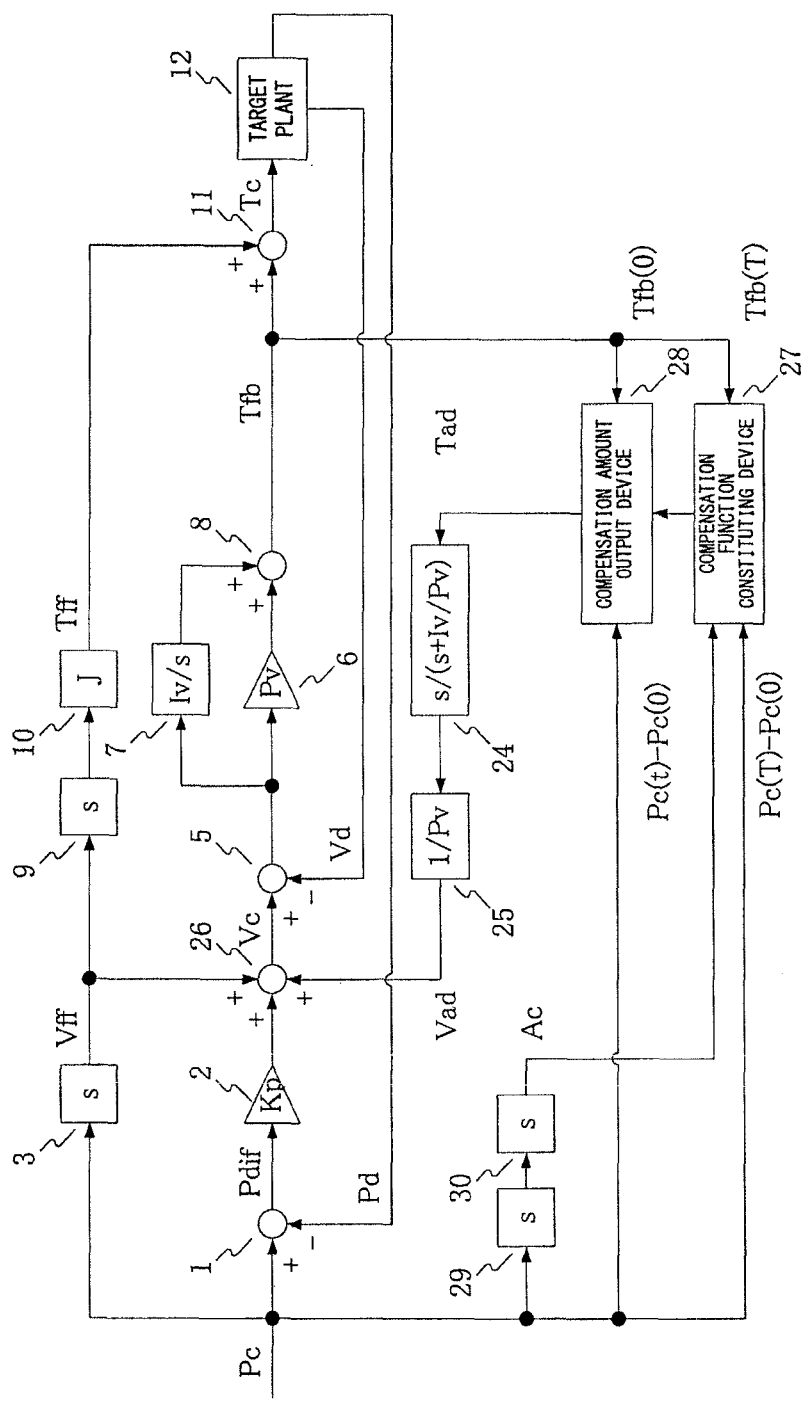
FIG. 11 is a block diagram showing an embodiment of the present invention.
Figure 12:
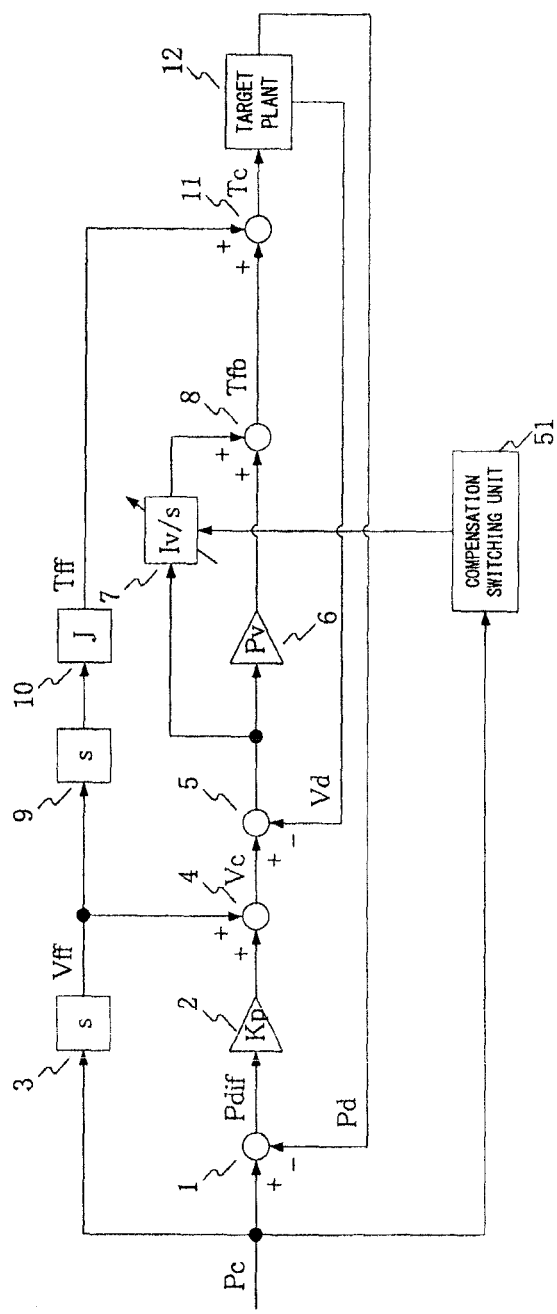
FIG. 12 is a block diagram showing prior art.

FIG. 11 is a view showing a control block related to a fourth embodiment of the present invention. The same elements as those in the prior art, the second embodiment, and the third embodiment are denoted by like reference numerals, and their descriptions will be omitted. A compensation function constituting device 27 functions as a correlation information constituting device that outputs the correlation coefficient K as correlation information indicating a relation among the sliding resistance acting on the movable unit, moving distance D(t)=Pc(t)−Pc(0) on the position command value, and command acceleration Ac. A compensation amount output device 28 outputs the torque compensation amount Tad based on the correlation coefficient K calculated by the compensation function constituting device 27, the feedback torque Tfb(0), and the moving distance D(t) on the position command value. The torque compensation amount Tad outputted from the compensation amount output device 28 is converted into a velocity compensation amount Vad via the low frequency cutoff filter 24 and the conversion gain 25, and the result is added with the output of the velocity command computing unit (proportional gain Kp) 2 and the velocity feedforward Vff by the adder 26 to constitute the velocity command value Vc.

This structure has both characteristics of the second and third embodiments. As described in the second embodiment, the number of attempts required until the optimum torque compensation amount Tad is specified can be reduced by the compensation function constituting device 27 and the compensation amount output device 28 without depending on the drive acceleration. In addition, as described in the third embodiment, the torque compensation amount Tad is converted into the velocity compensation amount Vad to perform compensation, so that even if the sliding resistance is varied, it is not necessary to vary the torque compensation amount Tad in accordance with the sliding resistance change.

As described above, when the moving direction is reversed, the position control device of the present invention can compensate the follow-up delay in response to the secular change such as the sliding resistance change without impairing the stability of the control system. In addition, the position control device has, as a compensation parameter, only the correlation coefficient among the drive acceleration, the moving distance after reversing, and the feedback torque, and the compensation parameter can be simplified. Furthermore, when the moving direction is reversed, a suitable compensation amount can always be compensated without varying the compensation amount in accordance with the sliding resistance change, and the compensation amount is converged to an optimum value by a fewer number of attempts.

What is claimed is:

1. A position control device for controlling a position of a movable unit by driving a servo motor in accordance with a position command value from a host device, comprising:
   a velocity command output unit configured to output a velocity command value in accordance with at least the position command value;
   a feedback torque output unit configured to output a feedback torque in accordance with a torque compensation amount and a value resulting from proportional integral amplification of a deviation between the velocity command value and a detected velocity value of the movable unit;
   a feedforward torque output unit configured to output a feedforward torque in accordance with the position command value and inertia of the movable unit;
   a torque command value output unit configured to output a torque command value in accordance with the feedback torque and the feedforward torque;
   a motor drive unit configured to drive the servo motor in accordance with the torque command value;
   a correlation information constituting device configured to calculate correlation information which is a value determined by dividing (i) a sliding resistance acting on the movable unit by, (ii) a moving distance on the position command value from a time when a moving direction reversing command is issued to the movable unit to a time when the movable unit inverts and starts to move; and
   a compensation amount output device configured to calculate accordingly the torque compensation amount corresponding to the position command value based on the correlation information and the feedback torque when reversing a moving direction of the position command value.

2. A position control device for controlling a position of a movable unit by driving a servo motor in accordance with a position command value from a host device, comprising:
   a velocity command output unit configured to output a velocity command value in accordance with at least the position command value;
   a feedback torque output unit configured to output a feedback torque in accordance with a torque compensation amount and a value resulting from proportional integral amplification of a deviation between the velocity command value and a detected velocity value of the movable unit;
   a feedforward torque output unit configured to output a feedforward torque in accordance with the position command value and inertia of the movable unit;
   a torque command value output unit configured to output a torque command value in accordance with the feedback torque and the feedforward torque;
   a motor drive unit configured to drive the servo motor in accordance with the torque command value;
   a correlation information constituting device configured to calculate correlation information which is a value determined by multiplying (A) a value determined by dividing (i) a sliding resistance acting on the movable unit by (ii) a moving distance on the position command value from a time when a moving direction reversing command is issued to the movable unit to a time when the movable unit inverts and starts to move, by (B) a coefficient that varies with drive acceleration; and
   a compensation amount output device configured to calculate accordingly the torque compensation amount corresponding to the position command value based on the correlation information and the feedback torque when reversing the moving direction of the position command value.

3. A position control device for controlling a position of a movable unit by driving a servo motor in accordance with a position command value from a host device, comprising:
   a velocity command output unit configured to output a velocity command value in accordance with at least the position command value and a velocity compensation amount;
   a feedback torque output unit configured to output, as a feedback torque, a deviation between the velocity command value and a detected velocity value of the movable unit after performing proportional integral amplification;
   a feedforward torque output unit configured to output a feedforward torque in accordance with the position command value and inertia of the movable unit;
   a torque command value output unit configured to output a torque command value in accordance with the feedback torque and the feedforward torque;
   a motor drive unit configured to drive the servo motor in accordance with the torque command value;
   a correlation information constituting device configured to calculate correlation information which is a value determined by dividing by: (i) a sliding resistance acting on the movable unit, by (ii) a moving distance on the position command value from a time when a moving direction reversing command is issued to the movable unit to a time when the movable unit inverts and starts to move;
   a compensation amount output device configured to calculate accordingly a torque compensation amount corresponding to the position command value based on the correlation information and the feedback torque when reversing the moving direction of the position command value; and
   a low frequency cutoff filter which has an inverse transfer characteristic of the feedback torque output unit and is configured to convert the torque compensation amount into the velocity compensation amount to output the velocity compensation amount.

4. A position control device for controlling a position of a movable unit by driving a servo motor in accordance with a position command value from a host device, comprising:
   a velocity command output unit configured to output a velocity command value in accordance with at least the position command value and a velocity compensation amount;
   a feedback torque output unit configured to output, as a feedback torque, a deviation between the velocity command value and a detected velocity value of the movable unit after performing proportional integral amplification;
   a feedforward torque output unit configured to output a feedforward torque in accordance with the position command value and inertia of the movable unit;
   a torque command value output unit configured to output a torque command value in accordance with the feedback torque and the feedforward torque;
   a motor drive unit for driving the servo motor in accordance with the torque command value;
   a correlation information constituting device configured to calculate correlation information which is a value determined by multiplying: (i) (A) a value determined by dividing a sliding resistance acting on the movable unit by (ii) a moving distance on the position command value from a time when a moving direction reversing command is issued to the movable unit to a time when the movable unit inverts and starts to move, by (B) a coefficient that varies with drive acceleration;

a compensation amount output device configured to calculate accordingly a torque compensation amount corresponding to the position command value based on the correlation information and the feedback torque when reversing the moving direction of the position command value; and a low frequency cutoff filter which has an inverse transfer characteristic of the feedback torque output unit and is configured to convert the torque compensation amount into the velocity compensation amount to output the velocity compensation amount.

5. The position control device according to claim 1, wherein:

the compensation amount output device is configured to calculate as a predicted moving distance, based on the correlation information and the feedback torque at the time of issuing the moving direction reversing command, the moving distance on the position command value from the time when the moving direction reversing command is issued to the movable unit to the time when the movable unit inverts and starts to move, and is further configured to output the torque compensation amount, which increases in accordance with an increase in a current moving distance based on the correlation information and the current moving distance, until the current moving distance, which is a moving distance on the position command value from the time of issuing the moving direction reversing command, reaches the predicted moving distance.

6. The position control device according to claim 3, wherein:

the correlation information constituting device is configured to output, as correlation information, a proportional coefficient between: (i) the sliding resistance acting on the movable unit, and (ii) the moving distance on the position command value until movement of the moveable unit is started; and the compensation amount output device is configured to calculate as a predicted moving distance, based on the proportional coefficient and the feedback torque at the time of issuing the moving direction reversing command, the moving distance on the position command value from the time when the moving direction reversing command is issued to the movable unit to the time when the movable unit inverts and starts to move, and is further configured to output the torque compensation amount, which increases in accordance with an increase in a current moving distance based on the proportional coefficient and the current moving distance, until the current moving distance, which is a moving distance on the position command value from the time of issuing the moving direction reversing command, reaches the predicted moving distance.

7. The position control device according to claim 2, wherein:

the compensation amount output device is configured to calculate as a predicted moving distance, based on the correlation information and the feedback torque at the time of issuing the moving direction reversing command, the moving distance on the position command value from the time when the moving direction reversing command is issued to the movable unit to the time when the movable unit inverts and starts to move, and is further configured to output the torque compensation amount, which increases in accordance with an increase in a current moving distance based on the correlation information and the current moving distance, until the current moving distance, which is a moving distance on the position command value from the time of issuing the moving direction reversing command, reaches the predicted moving distance.

8. The position control device according to claim 4, wherein:

the correlation information constituting device is configured to output, as correlation information, a proportional coefficient among: (i) the sliding resistance acting on the movable unit, (ii) the moving distance on the position command value until movement of the moveable unit is started, and (iii) drive acceleration; and the compensation amount output device is configured to calculate as a predicted moving distance, based on the proportional coefficient and the feedback torque at the time of issuing the moving direction reversing command, the moving distance on the position command value from the time when the moving direction reversing command is issued to the movable unit to the time when the movable unit inverts and starts to move, and is further configured to output the torque compensation amount, which increases in accordance with an increase in a current moving distance based on the proportional coefficient and the current moving distance, until the current moving distance, which is a moving distance on the position command value from the time of issuing the moving direction reversing command, reaches the predicted moving distance.

* * * * *